United States Patent
Garcia-Molina et al.

(10) Patent No.: US 8,166,385 B2
(45) Date of Patent: Apr. 24, 2012

(54) SPREADSHEET SYSTEM AND METHOD FOR MANAGING PHOTOS

(75) Inventors: Hector Garcia-Molina, Stanford, CA (US); Sean Kandel, San Francisco, CA (US); Andreas Paepcke, Menlo Park, CA (US); Martin Theobald, Saarbruecken (DE); Eric S. Abelson, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 366 days.

(21) Appl. No.: 12/583,883

(22) Filed: Aug. 26, 2009

(65) Prior Publication Data

US 2010/0058163 A1    Mar. 4, 2010

Related U.S. Application Data (60) Provisional application No. 61/190,388, filed on Aug. 27, 2008.

(51) Int. Cl.
*G06F 17/00* (2006.01)
(52) U.S. Cl. ....................................................... 715/220
(58) Field of Classification Search ................... 715/220
See application file for complete search history.

(56) References Cited

U.S. PATENT DOCUMENTS

| | | | | |
|---|---|---|---|---|
| 2005/0183002 | A1* | 8/2005 | Chapus | 715/505 |
| 2006/0212469 | A1* | 9/2006 | Babanov et al. | 707/102 |
| 2007/0136652 | A1* | 6/2007 | Ellis et al. | 715/503 |
| 2007/0245260 | A1* | 10/2007 | Koppert | 715/784 |
| 2008/0028288 | A1 | 1/2008 | Vayssiere et al. | |
| 2008/0215959 | A1* | 9/2008 | Lection | 715/201 |
| 2009/0138490 | A1* | 5/2009 | Hollemans et al. | 707/100 |

OTHER PUBLICATIONS

Kandel et al., Photospread: A Spreadsheet for Managing Photos, ACM CHI 2008 Proceedings, Apr. 5-10, 2008, p. 1749-1758.*
Kustanowitz et al., Hierarchical Layouts for Photo Libraries, IEEE Computer Society, IEEE Multimedia, Oct./Dec. 2006, p. 62-72.*

* cited by examiner

*Primary Examiner* — Laurie Ries
*Assistant Examiner* — Frank D Mills
(74) *Attorney, Agent, or Firm* — Lumen Patent Firm

(57) ABSTRACT

A spreadsheet system stores objects and formulas in the cells of the spreadsheet, along with metadata tags. Each cell may contain multiple objects (such as a group of photos). Drag-and-drop user actions automatically change tags associated with the moved objects based on a formula stored in the target cell if a forcing semantics mode is active, or automatically change a formula stored in the target cell if a non-forcing semantics mode is active. A formula in a cell selects a set of objects and may include set operators such as union, intersection, and minus. The formula may also filter sets to select a subset based on specified tag attributes of objects. The display of the spreadsheet adaptively selects a subset of objects to render in a cell and appropriately scales photos for optimal viewing.

1 Claim, 3 Drawing Sheets

SPREADSHEET SYSTEM AND METHOD FOR MANAGING PHOTOS

CROSS-REFERENCE TO RELATED APPLICATIONS

This application claims priority from U.S. Provisional Patent Application 61/190,388 filed Aug. 27, 2008, which is incorporated herein by reference.

FIELD OF THE INVENTION

The present invention relates generally to spreadsheet systems. More specifically, it relates to improvements to spreadsheet systems to facilitate the manipulation and analysis of multimedia data such as photographs.

BACKGROUND OF THE INVENTION

There has been a great deal of research on extending the spreadsheet paradigm. Spreadsheets have been extended to include support for image analysis, end-user programming, and data visualization. Most work has concentrated on data visualization. Spreadsheets have been extended to support complex objects in cells, such as charts and graphs. Some commercial products provide a drag and drop interface allowing users to create charts and graphs from existing data sources such as spreadsheets.

Many systems have been created to facilitate annotation of photos. These systems generally do not use the spreadsheet paradigm. Some approaches ease the process of tagging personal photograph collections by providing simple tagging interfaces, automatic content generation including tag suggestions, and integrating with third party photo sharing sites. Other approaches allow multiple users to collaboratively tag images. Much of the research for photo tagging concentrates on personal photo collections and not on scientific collections, which typically are much larger and have more tags per photo.

Systems are also built for browsing and retrieving images. Some approaches provide a zoomable interface to enable users to quickly navigate through large photo collections. Others provide 3D viewing environments out of 2D image collections using image based rendering techniques. Other systems have organized photos using timelines or hierarchical faceted metadata and dynamically generated query previews. Many applications, including those above, provide mechanisms for image retrieval, with the majority of systems employing content based image retrieval.

Existing spreadsheet systems, however, do not address certain fundamental needs that arise when working with large collections of objects having complex metadata attributes. There is still a need for simple and fast ways to quickly organize and analyze such collections of objects in a spreadsheet system.

SUMMARY OF THE INVENTION

In one aspect, a computer program product is provided which encodes computer program instructions for executing a computer-implemented spreadsheet method. The method includes storing a spreadsheet having an ordered set of cells, storing objects and formulas in the cells of the spreadsheet, storing tags associated with at least one of the stored objects, processing a drag-and-drop action by a user to move objects from a first cell to a second cell by automatically changing tags associated with the moved objects based on a formula stored in the second cell if a forcing semantics mode is active, and displaying the spreadsheet on a display to the user. The method may also include automatically changing a formula stored in the second cell so that the moved objects are included in a set of objects selected by the formula if a non-forcing semantics mode is active.

Each of the ordered set of cells in the spreadsheet has a data structure for storing i) a formula selecting a set of selected objects to be displayed in the cell and ii) a container comprising a set of objects. The formula selecting a set of selected objects may include references to tags of the stored objects. Each of the tags has an attribute-value pair. The formula selecting a set of selected objects may also include an operation on sets such as set union, set intersection, and set minus. The formula selecting a set of selected objects may also include a filtering operation on sets that generates a subset based on specified tag attributes of objects. The attribute-value pair of objects tags may include attributes such as object ID, date, location, value, as well as various user-defined attributes. The objects stored in the cells of the spreadsheet may be of various data types such as integers, decimal numbers, dates, character strings, photographs and video.

The displaying of the spreadsheet may include displaying a subset of the ordered set of cells. Furthermore, each cell of the subset displays a subset of the set of objects stored in the cell. Preferably, the subset of the set of objects stored in the cell is adaptively selected based on the number of objects stored in the cell, and the display size of the objects is adaptively scaled. In addition, a workspace window may be displayed that contains enlarged instances of objects in a currently selected cell of the displayed subset of cells.

DETAILED DESCRIPTION

Embodiments of the present invention are described herein as instances of a spreadsheet system called PhotoSpread.

Although this spreadsheet system may be used to organize and analyze various types of data, for the purposes of illustration the embodiments described herein will focus on organizing and analyzing collections of photographs. In general, the system can be used to similarly organize other multimedia types such as videos and audio, simpler types of data such as numbers and character strings, and mixed data types including any or all of the above in one spreadsheet.

PhotoSpread's unique features can be appreciated by considering specific use scenarios. In particular, consider two tasks: Photo query and analysis, and photo annotation.

When users analyze a large collection of annotated photos, they need to identify groups of photos based on their metadata particulars. The users need to layout the resulting photo groups in a way that is meaningful for the domain and task at hand. Users also need to combine groups of photos, extract their metadata, and compute statistics over that extract. Existing photo browsers and spreadsheet applications provide limited support for such querying and analysis.

Photo browsers typically allow users to filter collections using keyword search, or through metadata based facilities. PhotoSpread offers a more expressive query language than most photo browsers. PhotoSpread formulas can be composed of cell references, cell ranges, set operators, filter predicates, value selections and object-type-specific aggregations. Also, queries are implicitly saved within the cells in which they are defined, enabling users to easily chain queries or simultaneously view the results of multiple queries. Finally, PhotoSpread allows users to generate sets of related queries using simple copy and paste operations.

Common spreadsheet applications provide rich metadata analysis and visualization tools. However, they lack support for containing entire sets of data objects in a single cell. Each PhotoSpread cell can contain a set of objects, including images, and formulas that operate on these sets. Furthermore, objects have properties which users can access and manipulate within the spreadsheet. Also, PhotoSpread allows for drag-and-drop operations, providing an intuitive interface for manipulating objects.

Common database systems also support storage, querying and visualization of data. However, their interfaces are tailored for business data, and do not provide the spreadsheet and reorganization functionality that PhotoSpread does.

For photo annotation, a user starts with a large collection of photos with missing tags. Some tags, such as time or geographic coordinates, may be automatically generated by the camera. But many tags, like an animal's species, or the name of a person in a photo require human input (or at least human training of an image recognition system). Thus, the user must associate individual tags or groups of tags with individual or groups of photos. After the initial tagging, additional tags may be entered during the analysis phase, as conclusions are reached or as errors are discovered.

Many existing systems have introduced methods to facilitate photo annotation. Some approaches include automated content analysis or tag suggestions, while others concentrate on improving manual tagging interfaces.

PhotoSpread allows multiple methods for manually and semi-automatically tagging photos. Users can tag groups of photos with a single drag-and-drop operation. In addition, users can assign multiple attribute-value pairs to groups of photos with a single action. PhotoSpread also provides aids that suggest attributes based on previously used attributes, or on the contents of the text edit area. Many photo browsers and web applications also provide tagging interfaces. This support is usually limited to tagging one photo at a time, or a group of photos with one tag at a time.

PhotoSpread extends the current spreadsheet paradigm in several ways. PhotoSpread accommodates sets of objects (e.g., photos) annotated with tags (attribute-value pairs). Formulas can manipulate object sets and refer to tags. Photos can be reorganized (tags and location changed) by drag-and-drop operations on the spreadsheet. These extensions and their value can be appreciated by considering the motivations for developing a system for effectively analyzing vast collections of digital images and their associated metadata (i.e., tags). For example, field biologists often use outdoor camera traps (remotely triggered photographic equipment) to generate thousands of animal photographs. Each photo is automatically tagged with the date, the temperature, the location of the trap, and other metadata. In addition, biologists manually add tags describing the animal species, the identity of the individual animal (if known), and other facts. Biologists analyze these photos to discover trends and anomalies. For instance, they need to select groups of photos by their characteristics; groups of photos must be compared side-by-side; the scientists need to compute various statistics for particular sets of photos (e.g., average temperature), and so on. In addition, the biologists need to continuously edit the metadata, to correct errors or to enter additional facts they discover related to given photos.

Consider the following example. A biologist is studying the interaction in a nature preserve between deer (*Odocoileus hemionus*) and its main predator, the mountain lion (*Puma concolor*). A collection of photographs from camera traps has been stored in a database and student has previously tagged each photo with the species of the photographically captured animal. The photos are automatically tagged with additional information such as date, time, temperature, and location.

The biologist notices that in some photos the deer are bolting away from the camera, and wants to know why. The scientist now needs to assemble all the photos that show deer, and must add a "bolting" tag where appropriate. To test for a possible correlation between mountain lions and bolting deer, the biologist needs to determine the mean, median, mode and range of times when deer were skittish. Congruence of these times with mountain lions' dawn and evening hunting hours would demonstrate correlation. To see if temperature impacts behavior as well, the biologist additionally needs to examine temperatures at the time photos were captured.

An alternative hypothesis may be that deer are most skittish during the new moon, because the associated darkness makes predators hard to see. To verify, the biologist needs to divide the number of images that occur during a new (or 1st/3rd quarter) moon by the total number of images. After completing this skittish deer analysis, the biologist may need to replicate the process on other species, such as raccoons or bobcats.

If the biologist uses a conventional spreadsheet system, the spreadsheet contains only the metadata and links to photo files. They could group and analyze the metadata, but without seeing the respective photos as they proceeded. It is therefore difficult for these users to discover patterns that were hidden in the visuals of the images. Moreover, once these users identified photos of interest in this purely textual context, they then need to switch to a photo browser to see the images. During this step, connections to the results that had been computed over the metadata are lost. Updating the metadata is a painful process, both because it involves editing photos individually, using a cumbersome editor, and because the metadata are stored in multiple places.

Because PhotoSpread supports sets of photos within cells, biologists can easily see, side by side, the groups of photos they are interested in. As PhotoSpread supports tags for photos and other objects, its formulas can naturally refer to object metadata. And since PhotoSpread supports drag-and-drop reorganization, adding or modifying tags is simplified, and can proceed in concert with the data being analyzed. Photo-Spread offers several options for reorganization within the same spreadsheet paradigm. Biologists can therefore select the method that best suits their style, such as moving photos to formulas or moving strings to photos.

Similar photo analysis needs arise in various domains other than biology research. For example, a journalist needing photos for an article, may need to examine, filter or group photos of relevant events. An astronomer looking for patterns may need to examine large numbers of photos related to a particular area of the sky. Museums have digitized significant parts of their collections, both for preservation and for wider dissemination. These vast digital archives must be curated, which requires analysis and organization of materials. Last but not least, an amateur photographer may also want to organize and analyze his travel or family photos.

Fortunately, as our needs for photo analysis grow, computer display sizes have grown as well, either as individual, or multi-displays. This gain in screen real-estate has introduced new opportunities for coordinated, side-by-side photo set viewing. However, photographers with large collections of data-rich photos, like our biologist colleagues, currently use three types of tools that are not well integrated with each other: Photo browsers display images, spreadsheets afford computation over metadata, and databases (like MS Access) store the metadata. Unfortunately, no tool by itself fully addresses the increasing analysis needs.

Figure 1:
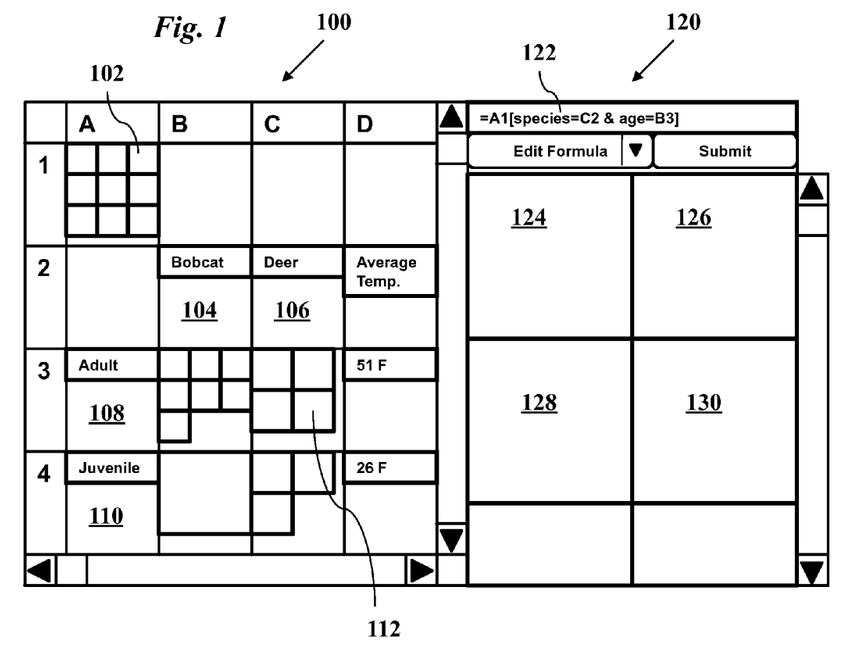
FIG. 1 is an illustration of a spreadsheet including a displayed grid of cells containing groups of objects and a workspace displaying details of a selected cell in the grid, according to an embodiment of the invention.

To meet this longstanding need, the present inventors designed and implemented PhotoSpread. To illustrate, FIG. 1 shows a typical PhotoSpread sheet. Like conventional spreadsheet systems, PhotoSpread displays an array of cells. Unlike conventional spreadsheets, however, each individual cell in PhotoSpread can contain and display not just a single object but a group of multiple objects. For example, the spreadsheet shown in FIG. 1 includes an array of cells 100 on the left portion of the display window. In this example, array 100 includes columns A, B, C, D and rows 1, 2, 3, 4. The single cell A1 contains a set of multiple photographs, such as photo 102. In this particular example, cell A1 is populated by a load command that imports a set of photos from one or more external data sources (e.g., photo traps). In displaying the photos in cell A1, PhotoSpread adaptively decides how best to utilize the given real estate in the cell to display a subset of the photos (which may include all the photos or a proper subset of the photos). Users can change cell dimensions by dragging the grid lines. The size and number of the photos in the cells are then automatically adjusted in response to the resizing.

Anchored to the right of the spreadsheet grid 100 is a work area 120. This "big cell" shows the enlarged contents of the currently active cell, in this case C3, for better viewing. The cell C3 displays four photos displayed as enlarged images 124, 126, 128, 130 in work area 120. The metadata for a particular photo in the work area can be viewed using a rollover tooltip window, and can be edited in the work area (not shown in this figure). If the current cell C3 contains a formula, the formula is shown, and can be edited, in the formula window 122 at the top of the work area 120. Keep in mind that FIG. 1 shows the user interface in a small area. On a large display, the photos, especially those in the work area, can be much larger and better appreciated.

To further illustrate the unique features of PhotoSpread, suppose the biologist wants to organize these photos along two dimensions, the animal species and the animal age. To keep this example simple, consider just two species, bobcat and deer, and two age groups, adult and juvenile. FIG. 1 shows how we have arranged these values into a grid. Columns B and C correspond to the two species, bobcat and deer, respectively. Rows 3 and 4 correspond to the two age groups, adult and juvenile, respectively. The column and row headings are set by entering strings into the cells. In particular, cell B2 contains object 104 whose value attribute is equal to "Bobcat," cell C2 contains object 106 whose value attribute is equal to "Deer," cell A3 contains object 108 whose value attribute is equal to "Adult," and cell A4 contains object 110 whose value attribute is equal to "Juvenile." Cell B3 thus corresponds to adult bobcats, cell C3 corresponds to adult deer, cell B4 to juvenile bobcats, and cell C4 to juvenile deer. These cells contain virtual groups of photos that are selected from the photos in cell A1 based on their attributes. Cell B3 contains the formula=A1[species=B2 & age=A3]. This formula selects those photos from A1 whose species attribute is equal to the contents of cell B2 (i.e. "bobcat") and whose age attribute is equal to the contents of cell A3 (i.e., "adult"). Thus, the adult bobcat photos contained in A1 are selected by the formula and displayed in cell B3. Similar formulas are entered into the other three grid cells, C3, B4, C4, so that they display, respectively, photos of adult deer, juvenile bobcat, and juvenile deer. It should be noted that, since the formulas in cells B3, C3, B4, C4 refer to the contents of the heading cells B2, C2, A3, A4 instead of containing literal strings, the photos displayed will automatically be updated if the contents of the heading cells change. For example, if cell B2 is changed from "bobcat" to "fox" then the photos in cells B3 and B4 will display sets of adult foxes and juvenile foxes, respectively.

As another illustration of the capabilities of the spreadsheet system, cells D3 and D4 show the average temperature for the adult and juvenile animals, respectively. The average for adults (i.e., cell D3) contains the formula=average (C3:D3.temp). Here, C3:D3 specifies a range of cells containing the adult photos of both species, and the .temp component extracts from their tags the value of their temperature attribute. As mentioned earlier, such metadata computations are important for biologists as they analyze their photos.

In addition to using formulas to organize and view photos and other data, PhotoSpread introduces a novel way of entering and/or updating metadata. For example, suppose a particular photo 112 is misclassified, e.g., the photo appears in cell C3 for adult deer, but it is really an adult bobcat. The photo's metadata species tag can be easily and quickly updated by simply dragging the photo from cell C3 to the cell B3 for adult bobcats. This drag-and-drop action forces the metadata to change, so that the photo complies with the formula of its new cell. Although this is the default behavior, other semantics for dragging are also provided, e.g., so that a new copy of the photo is made, or so that the metadata is not changed but instead the underlying formula of the receiving cell is automatically changed to include the new photo. In addition, strings can be moved to cells with photos (or vice versa) to tag photos. All these simple and intuitive drag-and-drop actions give the user a number of options for adding or changing the metadata of photos as the photos are being analyzed and studied. Tagging and re-tagging photos is commonly required by users organizing and analyzing photos. This drag-and-drop technique is much easier and faster than using traditional metadata editors.

In summary, PhotoSpread introduces at least two important extensions to common spreadsheet systems:
1. Sets of multiple objects (e.g., sets of photos) can reside and be displayed together in an individual cell. The objects—photos and other data types—can be conveniently tagged. A powerful formula language can select and manipulate objects, referring to tags in expressions. The language builds on widespread knowledge of standard spreadsheet formulas.

2. Drag-and-Drop (Re) Organization and (Re) Tagging. Simple graphical user interface (GUI) actions on photos and strings can automatically create or change metadata for multiple objects and formulas. Tagging photos through direct drag-and-drop manipulation is effective for tagging data, and PhotoSpread allows the user to configure such manipulations.

PhotoSpread may be implemented as both a standalone and/or web application. In one embodiment, photos and other objects are stored in memory. In other embodiments, a storage layer uses a backend database for storage and query processing.

The use of tagged sets and drag-and-drop organization pose a number of challenges to ensure a usable and effective realization. These issues and the solutions provided by the PhotoSpread system will now be discussed.

1. Data Model and Formula Language. Should the system support explicit photo "containers" (work areas that hold photos, like a directory does in a conventional system) or can we use the spreadsheet cells as containers? Can we extend our notion of "photo sets" to sets of strings, tags, numbers, etc.? Such an extension would enable us to extract all the tags in a particular photo set, and then assign these tags to another set. What formula language should we define, so that Excel users feel at ease, but can have access to the new set and tag features$\lambda$ We answer these questions in the Model section below, where we present our data model and associated formula language.

2. Drag-and-Drop (Re)Organization. There are two fundamental types of sets of objects: (a) materialized sets (stored in containers) and (b) virtual sets defined via formulas. The semantics of moving (or copying) a photo or other object from/to a set depend on the type of set. For example, moving a photo between two materialized sets is just like moving a photo from one physical pile to another. But what is the meaning of moving a photo to or from a virtual set (i.e., a formula cell)? Does copying a photo create a new instance or just a reference to the original photo? In the section on Reorganization, we explore the options, and determine what choices give the user a powerful way to reorganize photos.

3. Interface Issues. In the section on the Interface Design, we discuss some of the interface design challenges we faced. For example, what is the best way to use the large workspace area? Is this area a special type of cell (or container) or is it simply a window into an active spreadsheet cell? What is the best way to display photos in the limited-size cells? If all the photos do not fit in a cell display area, which ones do we show? How does one select multiple photos for a set operation?

Basic Model and Formulas

Figure 5:
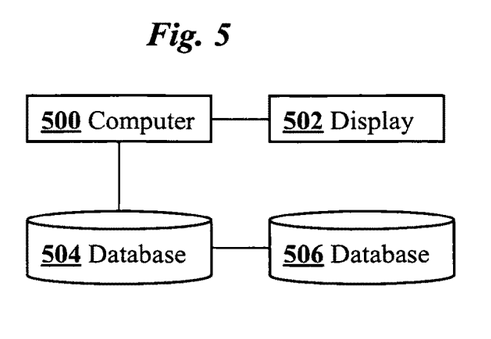
FIG. 5 is a schematic illustration of a computer system that may be used to implement a spreadsheet system, according to an embodiment of the invention.

In this section we describe the underlying PhotoSpread model for the spreadsheet, its objects, and their annotations. FIG. 5 schematically illustrates an example of a computer system that may be used to implement a spreadsheet system according to an embodiment of the invention. Computer 500 displays a spreadsheet to a user on a display 502. The spreadsheet's information is contained in a database 504 that may be stored in a memory on the computer or on a data storage system connected to the computer. An external database 506 can be used to import information into database 504, or it can also be used as a supplemental data source.

Our general philosophy is to use as a starting point a well known spreadsheet system and extend it to handle and display in a cell a set of objects, and in particular a set of photos annotated with tags.

As shown in FIG. 1, the spreadsheet is a two-dimensional array of cells, where each cell is referred to by its column and row identification. For example, cell C2 is at column C and row 2. Each cell has a display, i.e., an associated rectangular "screen canvas" where its contents can be displayed. Each cell can be in one of two states:

1. A cell can be a container holding a set of materialized objects, i.e., multiple objects that are stored in the PhotoSpread database. Conventional spreadsheets, by comparison, can only store a single object in a cell. Objects can be moved in and out of containers, just as if containers were physical piles of objects. A cell's display canvas shows a subset of the set of objects contained in it, i.e., some or all of its contained contents are displayed.

2. A cell can instead be a formula defining a virtual set of objects. A cell's display can show either the formula (e.g., when it is actively selected) or some of the objects that are selected by the formula. When a spreadsheet is initialized, all its cells are by default empty containers. A cell can be transformed into a formula cell by typing a formula into the formula editor. The set of virtual objects previously displayed is lost when a new formula is entered, although the actual objects are retained in the PhotoSpread database.

Figure 6:
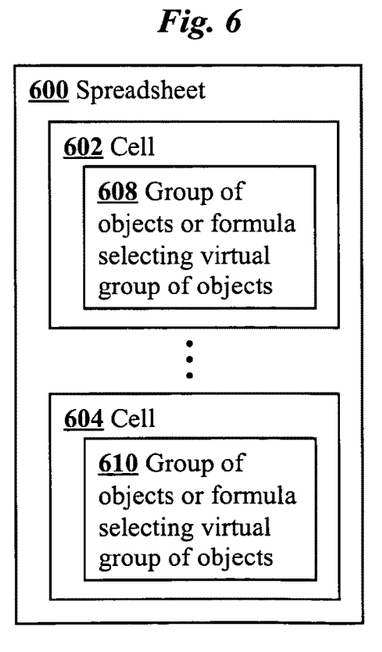
FIG. 6 is a diagram of a spreadsheet data structure where each cell of the spreadsheet may contain a group of objects or formula selecting a virtual group of objects, according to an embodiment of the invention.
Figure 7:
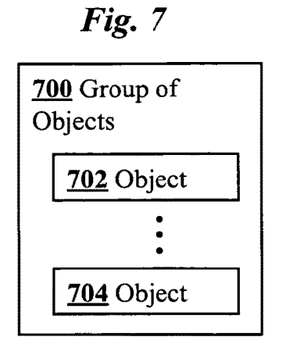
FIG. 7 is a diagram of a data structure for a group of objects where each group may contain multiple objects, according to an embodiment of the invention.
Figure 8:
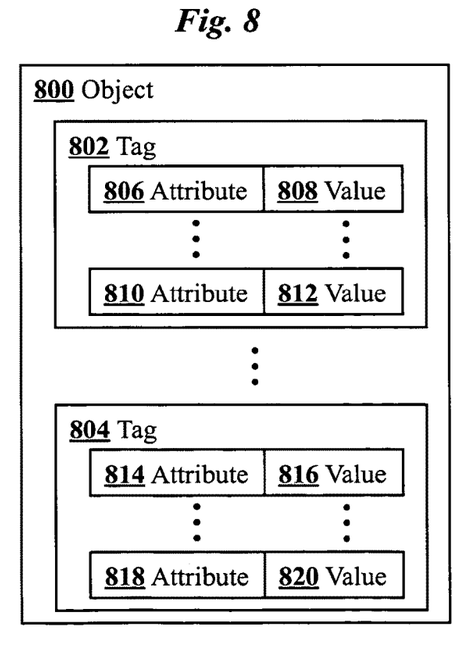
FIG. 8 is a diagram of a spreadsheet object data structure where each object may contain multiple tags and where each such tag may contain multiple attribute-value pairs, according to an embodiment of the invention.

FIG. 6 is a diagram of a spreadsheet data structure where each cell of the spreadsheet 600 may contain a group of objects or formula selecting a virtual group of objects. For example, cell 602 contains group of objects or formula 608, and cell 604 contains group of objects or formula 610. FIG. 7 shows the data structure for a group of objects 700 where each group may contain multiple objects, such as objects 702 and 704. In the spreadsheet system objects can be of various data types including integers, decimal numbers, dates, strings, photos, or other multimedia data objects. As shown in FIG. 8, each object 800 may be represented by an unordered set of tags 802 through 804, where each tag has an attribute-value pair. For example, tag 802 has attribute-value pair 806 and 808 and attribute-value pair 810 and 812. Similarly, tag 804 has attribute-value pair 814 and 816 and attribute-value pair 818 and 820. As a concrete example, a particular photo may have tags date: Jan. 1, 2008, location: Paris, VALUE <bits>, ID: 12345. All objects have a VALUE tag that holds the physical object representation, and an internal ID tag that uniquely identifies the object in the PhotoSpread database. A PROVENANCE tag can indicate the origins of a photo. As indicated by FIG. 8, our model allows multiple tags with the same attribute name, as well as multiple tag values. For example, a photo with tags species: squirrel and species: fox; cat shows a squirrel and either a fox or a cat. Note that non-photo objects are also represented by a set of tags. For example, the number "123" may be represented by size: small, VALUE: 123, ID: 23456. Here size is a user-defined tag. We will see that handling all objects in this flexible and uniform fashion gives us significant power in selecting, grouping and organizing not just photos but any values in PhotoSpread.

An important design question is how to handle object copies. In particular, say object O is in container cell C1 and we make a copy into cell D2. Is the object in D2 a different object than O, with a different ID and the same VALUE, or is it the same object O? That is, should copying be executed by-value or by-reference? In most cases, we believe the former is preferable. Allowing an object to be in more than one container would save storage but would complicate the spreadsheet system, as containers would have to hold indirect references to objects. Indirect references also complicate formula processing, as discussed below. Thus, PhotoSpread handles object as unique entities, even if they were generated from a copy operation.

A formula defines a virtual set of objects based on the contents of other cells. Within a formula other cells are referred to by their names, e.g., C2 or D5. Ranges of cells are referred to by specifying two cells separated by a colon, e.g., B2:C3 refers to the union of the contents of cells B2, B3, C2, C3. As in conventional spreadsheets, PhotoSpread allows dollar signs in cell references to control how equations are copied. For example, if a formula with reference A$2 is copied to a cell that is three horizontal units over and two vertical units down, the reference becomes D$2. The vertical coordinate 2 is not shifted because of the dollar sign.

PhotoSpread provides three set operators in formulas: union, intersection, and complement (or minus). For example, union(C1, D3:D5) represents the objects that are in C1 or D3 or D4 or D5. The formula intersect(C1, D3, F2) represents the objects that are in all three cells C1, D3, and F2. The formula minus (C1, D3) represents the objects that are in C1 but not in D3.

Filter expressions permit the selection of particular objects from a set. For example, C1[species=fox & date<1/1/08] selects the objects in C1 with a species:fox tag and a date tag valued earlier than Jan. 1, 2008. Note that quotes around string values are not required, because the underlying computational engine can determine this data type by context. To select C1 photos that show both a fox and a deer, we can write either intersect(C1[species=fox], C1[species=deer]) or C1[species=fox & species=deer].

Note that filter expressions may include sets. For example, say C1 contains two string objects, one with VALUE:fox, and another with VALUE:deer. The formula D1 [species=C1] is equivalent to D1[species={fox,deer}], and selects photos with either deer or foxes. The power to refer to cells with strings and other data types makes it possible to display on the spreadsheet the values that are used (via indirection) for filtering.

A value selection expression permits the extraction of values from the tags on an object. For example, C1.location returns the set of values associated with the attribute location of any object in C1. Similarly, C1[species=fox].location returns locations of any fox objects in C1.

PhotoSpread also allows aggregation operators like maximum, minimum, sum, average and count. For instance, count (C1) returns the number of objects in C1. For instance, average (C1[species=fox].age) returns the average age of foxes in C1.

Readers familiar with database query languages like SQL will see that PhotoSpread provides a lot of the power of such languages (we have left out some functionality such as GROUP BY and JOINS). At the same time, the formula language is relatively simple and similar to that used by conventional spreadsheets.

Furthermore, several of our design decisions allow the underlying computation engine to be of manageable complexity. For instance, when a formula refers to a cell that is also a formula the result is a nested formula, which may then be simplified. For example, assume that C1 is defined by union(D1, D2). Then the formula union(C1, D2) is effectively union(D1, D2, D2), which can be simplified to union(D1, D2).

Formulas can be further simplified when they refer to container cells, due to the "no duplicate object" assumption. For example, if C1 and C2 are containers, then intersection(C1, C2) is empty! However, if C2 is a formula, then the result may or may not be empty. For instance, if C2 is defined by union (C1, D3) and D3 is a container, then intersection(C1, C2) is equivalent to container C1.

This example illustrates that it is convenient to expand a nested formula until all cell references are to containers, because at that point intersection and minus operations can be simplified. Formulas that only refer to containers are called base formulas. When discussing reorganizations in the next section we will also see that it is useful to convert a formula to its equivalent base formulation.

Direct Content (Re)Organization

PhotoSpread formulas can group and filter displayed photos (and other objects). In addition, PhotoSpread one can go further and (i) organize or reorganize photos, and (ii) tag photos by dragging and dropping. That is, drag-and-drop operations can be used to conveniently change photo metadata. How this direct manipulation reorganization works depends on three factors:
1. Whether the source/destination cell is a container or a formula;
2. Whether the action is a copy or a move;
3. Whether the intended semantics are force (metadata change) or not.

First, suppose that photo X is dragged by a user from source cell S1 to destination cell D2, and that both S1 and D2 are containers. In this case, copy and move work as expected, as if one were moving a physical photo from one pile of photos to another. That is, moving a photo removes it from S1 and adds it to D2. Photo X's metadata is not changed. Copying a photo creates a new copy at D2, with the same metadata (except for the ID tag; a new ID is generated). Since metadata does not change, force semantics are not applicable here.

Figure 2:
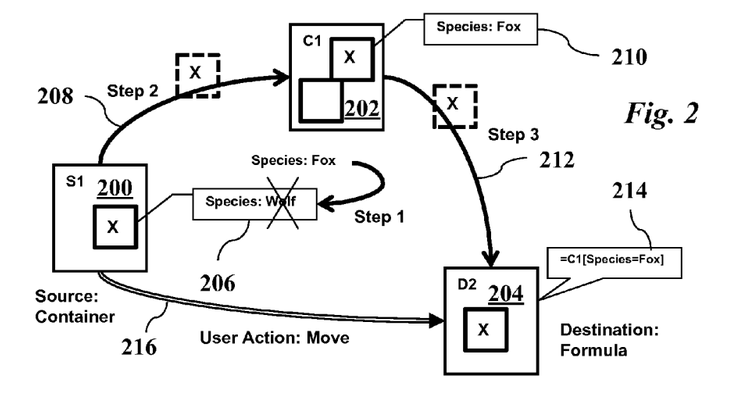
FIG. 2 is a schematic illustration of a drag-and-drop process in which tags of the moved objects are automatically modified using force semantics, according to an embodiment of the invention.

Next, suppose that source S1 is a container, and destination D2 is a formula, as shown in FIG. 2. The key issue here is how cell D2 "absorbs" X, driven by whether force semantics are on. Consider first a move action with force semantics (which is the default in PhotoSpread). In this case, X's metadata is changed to satisfy the D2 formula. As shown in the example of FIG. 2, cell 204 (D2) contains a formula 214. This formula C1[species=fox] selects the photos in cell 202 (C1) whose species attribute is fox. Now suppose source cell 200 (S1) contains a misclassified photo X: the image is classified as a wolf but should be properly classified as a fox. To correct the error, the user performs a drag-and-drop action 216 to move photo X from cell 200 (S1) to cell 204 (D2). Three things happen because of this move action (with force semantics): Step 1, X's metadata 206 is modified, so the species:wolf tag becomes species:fox (if no species tag existed, it would be added). Step 2, photo X is automatically moved 208 by the system from container cell 200 (S1) to container cell 202 (C1). Note the photo is not moved to cell 204 (D2). Cell 204 (D2) is not a container but simply a filtered view of cell 202 (C1), so if X is to be seen in cell 204 (D2), it should be contained in cell 202 (C1). Step 3, photo X is now automatically displayed 212 in cell 204 (D2) since it now satisfies the formula 214.

In general, to determine the necessary changes to be made by the system in response to a user drag-and-drop action, the system first transforms a formula like 214 to a base formula that refers only to containers. Then the system determines the changes necessary to make X be one of the results of the target cell. In some cases the changes may not be unique. For example, suppose D2=union (C1, C2). To satisfy this formula, X can either be placed in C1 or in C2. There are several options for handling non-unique transformations: (1) ask the user for clarification, (2) pick any choice, or (3) disallow such transformations. Preferably, PhotoSpread defaults to option (1), but other options could be selected by user customization or over-ride of the default.

We have seen earlier how move with force semantics can be useful for either adding new tags to photos or re-tagging photos that were incorrectly tagged. While PhotoSpread does have a tag editor for individual photos in the work area, forced moves allow a much more intuitive and rapid organization of photographs.

Copying X from a container to a formula works as with a move, except that a new photo is created with the same tags, which are then forced as appropriate.

Figure 3:
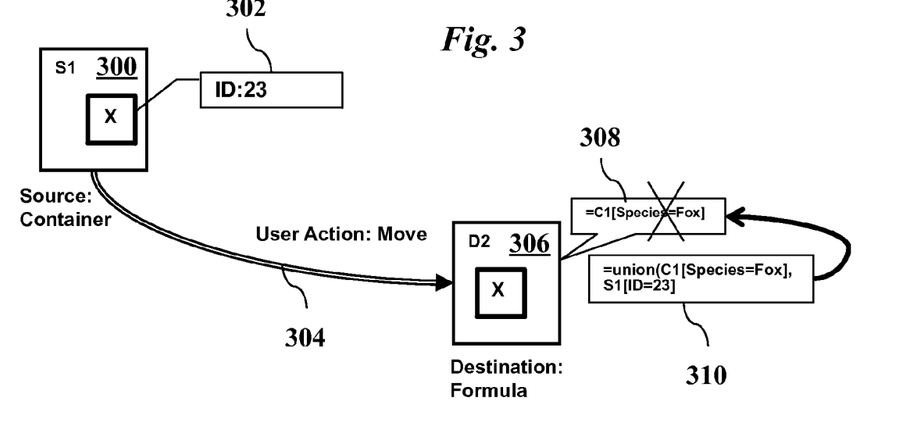
FIG. 3 is a schematic illustration of a drag-and-drop process in which a formula of a target cell is automatically modified to include the moved objects using non-force semantics, according to an embodiment of the invention.

Next, consider the case of non-force semantics, as illustrated in FIG. 3. When the user moves 304 (or copies) photo X from container cell 300 (S1) to formula destination cell 306 (D2) with non-force semantics, she does not wish to change X's tags. So to make X appear in D2 the underlying engine changes the formula 308 at D2. In particular, the engine can change the formula 308 to a new formula 310 equal to union (prev, S1[ID=23]), where ID=23 is the unique identifier 302 of photo X, and prev is the original D2 formula 308. Notice that X remains in cell S1 (for both move and copy actions). Because the user is moving the object X to a formula cell and does not want to change X, the engine's only alternative is to leave X in its current container cell.

Non-force semantics are relevant when users want quickly to construct a complex formula without the formula editor. For example, by dragging and dropping, a user can rapidly create a virtual set of particular photos without having to write out a formula such as union(C1[Id=123], C1[ID=234], C2[ID=345]). Non-force semantics can also be helpful when a formula has exceptions. For instance, a biologist may know that all squirrels have a particular disease, but she also knows of two individual gophers that are afflicted. To view all the sick animals, she can define a formula to display photos with species=squirrel and then manually add photos of the two sick gophers.

The options when a user moves a photo X out of a formula source S1 are analogous: the compute engine changes X's tags (force) or the formula (non-force) so that X does not appear in S1. In this case, force semantics are probably not very useful since there are many ways to change tags such that X moves out of S1. Consequently, in PhotoSpread, the default semantics when S1 is a formula is preferably non-force.

Finally, there are two ways to generalize the functionality we have described. First, users can re-organize entire groups of photos at once by control/option selecting the target photos in the source cell and then dragging the selection as a group.

Second, the data type of the objects can be generalized. For example, the cells may have strings as content. Considering various combinations of factors when strings are involved in a re-organization, two main scenarios are useful and are preferably implemented in PhotoSpread.

String Case 1: Source container S1 has one or more strings, which are dragged to photo destination D2 (container or formula) with force semantics. For example, suppose the string species:fox is dragged to D2. The result is to add the tag species:fox to the photos in D2 if they do not have a species tag, or to change their species tag to species:fox if a species tag is present. If the copied string is simply fox, PhotoSpread prompts the user for the attribute to use. Note that non-force semantics are not as useful here, because they result in a cell containing a mixture of photos and tags.

String Case 2: Photos from source S1 are dragged onto destination D2 containing one or more strings (with force semantics). The effect is analogous: the metadata of the dragged photos is changed to include the D2 tags. The photos do not actually move, unless their new meta data causes them to move.

In summary, PhotoSpread offers a variety of methods for changing the location of photos and for tagging and retagging photos. Scientists that handle large number of photos will likely have their own style of working, manually or with existing tagging tools. Some may prefer the paradigm of moving tags onto photos, others may prefer to move photos to "places" that represent their characteristics. Yet others may prefer to manually enter tags using a tag editor. PhotoSpread offers all the choices within the same framework: A user that prefers to move tags, can layout an array of tags at the bottom or top of his spreadsheet, and then move these tags onto photos or groups of photos as necessary. If a user prefers moving photos, she can set up an array of photo "piles" (defined with formulas), as illustrated earlier. At any time, the user can inspect and modify tags of individual photos by using the object editor we provide as part of the workspace.

Interface Issues

Next, we discuss design issues for the user interface.

Screen Layout

In many spreadsheet applications, by default, the entire window is used to present the spreadsheet grid. Preferably, the PhotoSpread design includes a separate workspace, roughly one-third the size of the window. The workspace reduces the overall size of the displayed spreadsheet grid and the average size of a cell in the sheet, but allows users to view an enlarged version of the contents of a selected cell in the grid. This allows biologists, for example, to focus on photos of interests while maintaining the context of working within the larger spreadsheet.

Workspace

The dedicated workspace allows users to view enlarged contents of a selected cell, such as C3 (FIG. 1). User actions in the workspace have the same effect as if they had been executed in the respective cell. For instance, a user can delete an image in C3 by choosing "Delete Image" from a context menu in the workspace while it is displaying the contents of C3. This operation has the same effect as deleting the image by interacting with cell C3 directly in the grid. In this way, the workspace contents are always intimately tied to the spreadsheet cell that is in focus.

An alternative embodiment may have the workspace function as an external library, containing objects that may or may not exist in the spreadsheet. In most spreadsheet applications, values and formulas only exist within the spreadsheet and there is no notion of an external library of values, so this alternative may be confusing for users accustomed to conventional spreadsheets.

In addition to displaying enlarged contents of a cell, the workspace provides functionality to view and edit metadata, edit cell formulas, load images into cells and facilitate tagging. By rolling over an object in the workspace, users can view the object's metadata, and by right clicking the object, users can edit its metadata using an in place editor.

Located at the top of the workspace are a text field, a drop-down menu (which in FIG. 1 is set to the choice "Edit Formula"), and a "Submit" button. Using the drop-down menu, a user can choose to edit a cell's formula, load images into a cell, or tag objects that are located in a cell. The text field allows users to view or enter information relevant to the various actions, such as the text of a formula. Clicking the submit button executes the requested action.

To facilitate formula editing, the text field preferably provides context sensitive auto-suggest hints, such as attribute types and function names. Any attribute type ever defined in the spreadsheet will appear as an option in the autosuggest list.

To load images into a cell the user may enter either a list of image URLs, individual image IDs, or image set IDs into the text field. The images are retrieved from the local disk or over the web as appropriate.

Finally, the user can enter an attribute A into the text field to accelerate tagging. While A is present in the text field, any string dropped onto selected photos in the workspace is taken to be a value assigned to the A attribute of the photos. For example, if a biologist wanted to add tags with attribute Gender and value Male or Female to photos in the workspace, she might type Gender into the text field, Male into cell A2, and Female into cell B2. She could then proceed screen by screen, each time selecting all males and dragging string Male from A2 onto the selected photos; females would be tagged analogously.

Controlling Motion

As described above, users can drag and drop objects within the spreadsheet, and the result of this action depends on the intended semantics. We considered both moded and non-moded alternatives as affordances for communicating force, or non-force intent during drag-and-drop interactions.

Biologists often work on specific, extended tasks. They dedicate some time to tagging photos, and then later spend time querying and organizing the images. For these specific tasks, a moded interface has advantages over a modeless interface, as biologists do not have to repeatedly indicate their intentions, which remain consistent throughout a given task. When scientists switch tasks, they simply switch modes as well. A disadvantage of the moded choice would, as always, be the potential for confusion as system behavior changes in response to an action.

We opted for the non-moded choice, loosely basing our interaction design on conventions for drag-and-drop behaviors in desktop GUIs. Control keys or right/left-clicks can provide mode switching. If the user left-drag-and-drops a group of objects, default semantics are applied, i.e., Forced Move. Control-drag-and-drop results in a Forced Copy operation. Finally, shift-drag-and-drop raises a context menu with all the available Move/Copy and Force/Non-Force options. Specific implementations can be deployed for specific platforms or users.

Force is preferable for default semantics because much of user time focuses on tagging and editing photo metadata. Once photos are tagged, queries can be used to organize and filter collections. Users do not (currently) tend to spend time manually laying out their photos. Force semantics allows the biologists to quickly tag and edit photos, while Non-Force only functions to rearrange the photo layout within the spreadsheet. Force semantics are therefore more appropriate for the majority of the biologists' tasks. Note that extended availability of PhotoSpread for layout activities might change this behavior, and other alternatives may be preferable in other use contexts.

Photo Layout

Each cell in PhotoSpread may contain an arbitrary number of objects, and in particular, an arbitrary number of images. Although with a large display each cell can be relatively large, it is still critical for PhotoSpread to maximize the size and number of images that appear in each cell. To simplify the problem, each image is preferably resized to be displayed as a square. Resizing is preferably constrained to retain a minimum predetermined size, m. Users can thus generally perceive some details in the images. For large collections, many images are typically not displayed in their cell. The display engine must thus determine a representative subset of images to present. Many algorithms, including last-in-first-out (LIFO), first-in-first-out (FIFO), and more sophisticated summarization approaches are candidates for use as display group constructors. A preferred embodiment uses LIFO so that the effect of drag and drop operations on a cell containing many images is immediately visible.

Figure 4:
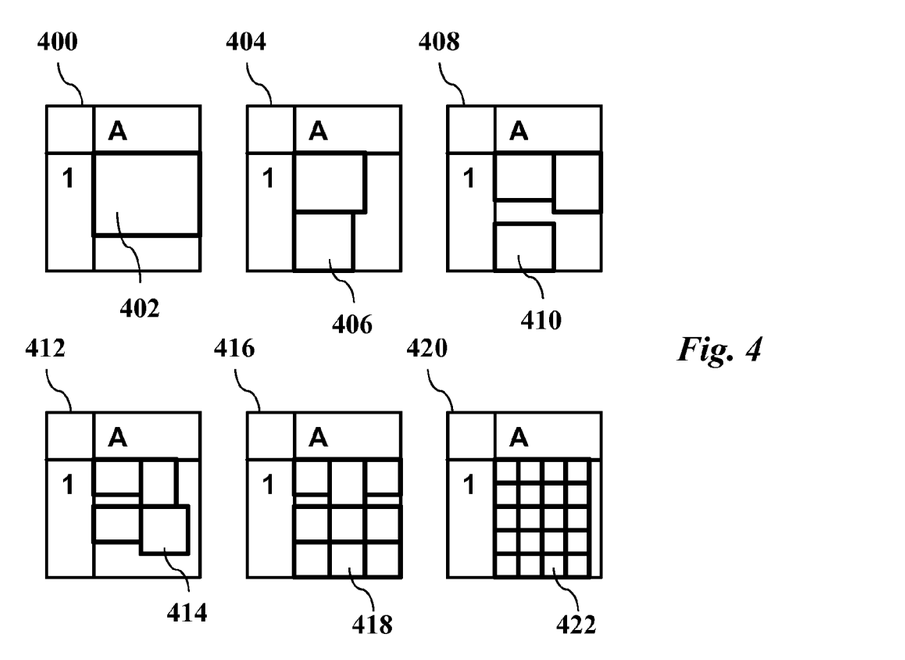
FIG. 4 is an illustration of a single displayed cell showing adaptive scaling of the objects displayed in the cell, according to an embodiment of the invention.

Within each cell the largest feasible size for displaying each photo is automatically computed so that the display size is adaptive. Let x be the horizontal dimension of the cell, y the vertical dimension of the cell, and N the number of photos to display in the cell. For now, assume that all N images fit in the cell without violating the minimum size m constraint introduced above. Let r=x/y be the ratio of the width of the cell to its height. The value of S, the maximum dimension of the square container for each photo, is then computed such that all photos can fit within the cell. It can be shown that the largest feasible S value is given by $$S = \text{Max}[\text{Min}(x/a, y/b), \text{Min}(x/c, y/d)],$$

where $a = \lceil \text{sqrt}(rN) \rceil$, $b = \lceil N/a \rceil$, $c = \text{Max}(\lfloor \text{sqrt}(rN) \rfloor, 1)$, and $d = \lceil N/c \rceil$. If S<m then all N photos can not be displayed in the cell, so S is set to m. Once the photo size S is determined, the photos may be displayed side by side in the cell such that each photo is contained within a square of size S.

FIG. 4 shows this equation in action. The same cell is shown as more photos are added. The cell in its initial display state 400 contains one image 402 that is expanded to fill the available space. If a second photo 406 is added, they are arranged as shown in cell display state 404. A third photo 410 results in state 408, a fourth photo 414 results in cell state 412, a fifth photo 418 results in state 416, and a sixth photo 422 results in state 420. As photos are added, they are made as large as possible. If the minimum size constraint is hit, the photos will not shrink further. For instance, if the photo size with seven photos were too small, the display would stay with six photos even as more were added.

CONCLUSION

PhotoSpread advantageously combines photo computational notions with organizational tasks. Of course, the system as described above may be implemented in various ways to provide additional and alternative features. For example, tools for managing photos across multiple repositories may be provided. Typically, photos are taken by multiple users or sets of camera traps. In each instance, the photos reside on some computer and are copied into an analysis tool like PhotoSpread. After the metadata is edited, it is often important or useful to push back the changes to the original source. Sometimes the photos themselves are additionally changed in an image editor. A distributed photo repository can provide PhotoSpread's computational facilities, plus object versions, recovery, locking and other data management services.

Although this description has focused on field biologists as our main PhotoSpread target users, analogous photo analysis requirements exist and would be useful in many other environments. Museum curators, journalists, astronomers, and others have large image collections that need to be understood and dissected. It will also be appreciated that, although this description has focused on photographs as the primary example for purposes of illustration, other data types may also be used with this spreadsheet system to provide analysis and organization, including easy tagging and retagging.

The invention claimed is:

1. A non-transitory computer-readable storage medium embodying computer program instructions executable by a computer to implement a computerized spreadsheet by performing the following steps:
   a) storing a spreadsheet comprising an ordered set of cells, wherein each of the cells has a data structure for storing i) a formula selecting a set of selected objects to be displayed in the cell and ii) a container comprising a set of objects;
   b) storing objects and formulas in the cells of the spreadsheet, wherein the stored objects are photos;
   c) storing tags associated with at least one of the stored objects, wherein each of the tags comprises an attribute-value pair;
   d) processing a drag-and-drop action by a user to move objects from a first cell to a second cell, wherein the processing comprises,
   i) if a forcing semantics mode is active, automatically changing tags associated with the moved objects based on a formula stored in the second cell, and
   ii) if a non-forcing semantics mode is active, automatically changing the formula stored in the second cell; and
   e) displaying the spreadsheet on a display to the user.

* * * * *

UNITED STATES PATENT AND TRADEMARK OFFICE
CERTIFICATE OF CORRECTION

PATENT NO. : 8,166,385 B2
APPLICATION NO. : 12/583883
DATED : April 24, 2012
INVENTOR(S) : Hector Garcia-Molina It is certified that error appears in the above-identified patent and that said Letters Patent is hereby corrected as shown below:

Insert the following paragraph at col. 1, line 10, just prior to "FIELD OF THE INVENTION":

--STATEMENT OF GOVERNMENT SPONSORED SUPPORT
This invention was made with Government support under contract 0430448 awarded by the National Science Foundation. The Government has certain rights in this invention.--

Signed and Sealed this
Nineteenth Day of June, 2012

David J. Kappos
*Director of the United States Patent and Trademark Office*